(No Model.) 2 Sheets—Sheet 1.

W. TAYLOR.
SPIKE.

No. 411,841. Patented Oct. 1, 1889.

Witnesses:
Josiah W. Ells
Jas. Williams

Inventor.
William Taylor (No Model.) 2 Sheets—Sheet 2.

W. TAYLOR.
SPIKE.

No. 411,841. Patented Oct. 1, 1889.

UNITED STATES PATENT OFFICE.

WILLIAM TAYLOR, OF ALLEGHENY, PENNSYLVANIA.

SPIKE.

SPECIFICATION forming part of Letters Patent No. 411,841, dated October 1, 1889.

Application filed April 19, 1888. Serial No. 271,249. (No model.)

*To all whom it may concern:*

Be it known that I, WILLIAM TAYLOR, a citizen of the United States, residing at Allegheny, in the county of Allegheny and State of Pennsylvania, have invented a new and Improved Nail or Spike; and the invention I have made consists in the production of a nail or spike constructed with a triangular or three-cornered shank or body having a hooked head and a cuneated or wedge-shaped point.

The construction and form of my improved nail or spike will be readily understood from the following description, taken in connection with the accompanying drawings, wherein—

Figure 1:
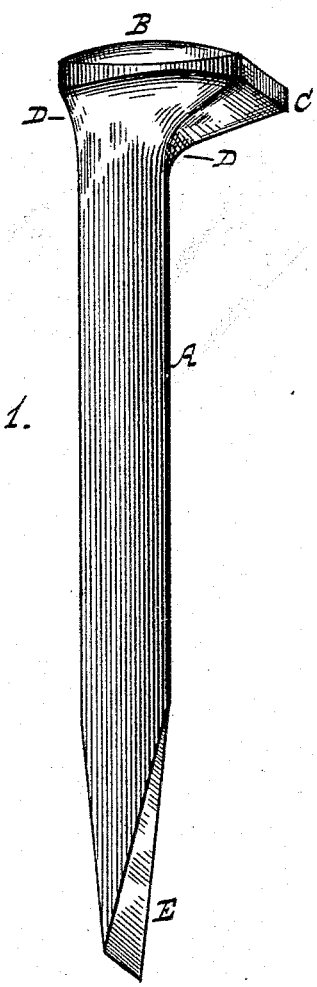
Figure 2:
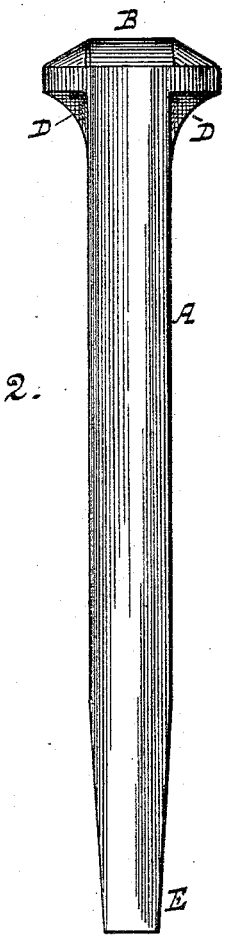
Figure 3:
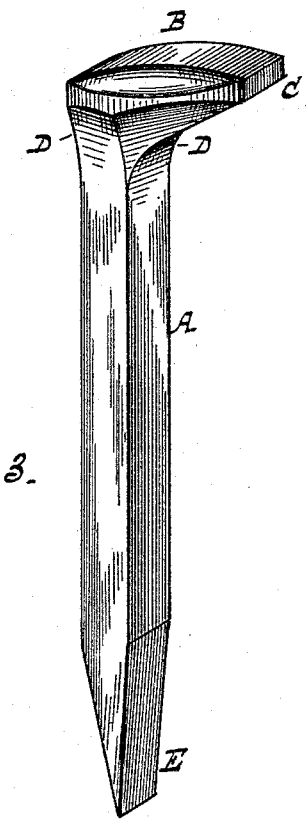
Figure 4:
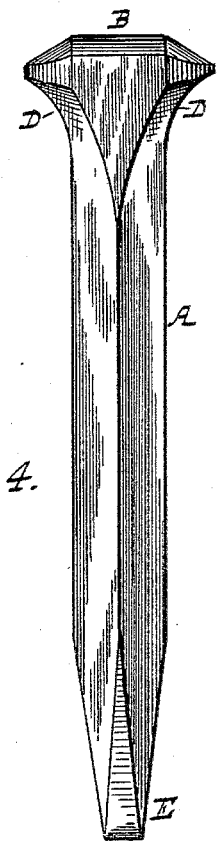

Figure 1 represents a perspective view of my improved nail or spike, the hooked head of which projects so as to overhang one of the corners of its triangular shank; Fig. 2, a rear elevation of the same; Fig. 3, a perspective view of a nail or spike provided with a hooked head that overhangs one of the flat faces or sides of its triangular shank; Fig. 4, a rear view of the same.

In the form or structure of my nail or spike the shank or body A is three-cornered or triangular, having three plain sides which meet in three parallel lines, edges, or corners extending the greater portion of its length. A head B is formed on one end of this triangular shank by a joint operation of bending and staving, so as to cause that portion of the metal to extend or project mostly to one side of the shank, thereby forming a thick hook C, of greater length than breadth, and gradually thinner as it extends from its shank. This head is rounded on top transversely and longitudinally, being similar in that respect to the heads of railroad-spikes. At the juncture of the head and body the shank A is gradually swelled or thickened, constituting curved and spreading shoulders D, which very materially assist in supporting the head. In the formation of the head B it may be caused to project over one of the flat sides of the triangular shank, as shown in the drawings, Figs. 3 and 4; but I prefer to turn the head B in an opposite direction, so as to overhang centrally one of the corners or angles of the shank, as shown in the drawings, Figs. 1 and 2. That part of the triangular shank A most remote from its head B is cuneated or formed in the shape of an acute-angled wedge, so as to produce a suitable point E; but any other shape may be given to it that in use will be found more desirable. One or all of the flat sides of this nail or spike may be nicked or notched, or one of the angular edges so nicked or notched, leaving the sides plain.

I am well aware of the fact that it has been proposed to use a hook-headed spike having a shank triangular in section near the point, and having the upper part (from one-third to one-half) of the shank—that is, the part adjacent to the hook—square in cross-section, in combination with a head which is flat on the under sides and devoid of the peculiarly curved or concave swelled shoulders clearly shown herein at D D. It is a well known fact that a nail triangular in section can be driven into wood much more easily than one can which is round in section or one which is square, on account of the great reduction in the material which tends to obstruct the longitudinal passage of the nail. The nails which are square or round in cross-section must displace much more of the wood fibers than do those which are triangular, and this is true no matter how carefully the points and lower portions of the shanks may be made. Hence the spike that I herein show is superior to those above referred to, which were partly triangular in section and partly square. There is another important difference arising from the fact that in my case the shank is continuously triangular from end to end—namely, that it can be produced much more cheaply without impairing its strength, as it can be formed from continuous rods of rolled iron of the same cross-section at all points. When the spikes are made partly of square and partly triangular, they require a number of operations additional to those required when they possess the features of those herein shown. The shank being of shorter through dimensions than if it were square or round, the joint between the head and shank is relatively weakened; but this I completely overcome by forming the above-described curved shoulders joining the surface parts of the flat sides to the metal of the head. These may be varied in shape without materially affecting this part of the invention. Without such shoulders it is difficult to reduce the amount of metal in the shank and yet provide sufficient strength.

I claim—

1. A new article of manufacture consisting of a hook-headed nail or spike having a shank of triangular form its entire length and outwardly-curved triangular shoulders underneath the head.

2. A hook-headed nail or spike having a triangular shank, the triangular sides of which are thickened and spread outwardly into curved triangular shoulders forming part of the head.

3. A hook-headed nail or spike having a shank of triangular form its entire length, a suitable point, and outwardly-curved triangular shoulders forming part of the head.

WILLIAM TAYLOR.

Witnesses:
 JOSIAH W. ELLS,
 JAS. C. WILLIAMS.